(No Model.)

P. H. STEIN.
VEHICLE WHEEL.

No. 292,143. Patented Jan. 15, 1884.

WITNESSES:

Philip H. Stein
INVENTOR.

By Louis Bagger & Co.
ATTORNEYS.

UNITED STATES PATENT OFFICE.

PHILIP HARRIS STEIN, OF AUSTIN, TEXAS, ASSIGNOR OF ONE-HALF TO JAMES W. SHEPARD, OF SAME PLACE.

VEHICLE-WHEEL.

SPECIFICATION forming part of Letters Patent No. 292,142, dated January 15, 1884.

Application filed August 18, 1883. (No model.)

*To all whom it may concern:*

Be it known that I, PHILIP H. STEIN, a citizen of the United States, and a resident of Austin, in the county of Travis and State of Texas, have invented certain new and useful Improvements in Vehicle-Wheels; and I do hereby declare that the following is a full, clear, and exact description of the invention, which will enable others skilled in the art to which it appertains to make and use the same, reference being had to the accompanying drawings, which form a part of this specification, and in which—

Figure 1:
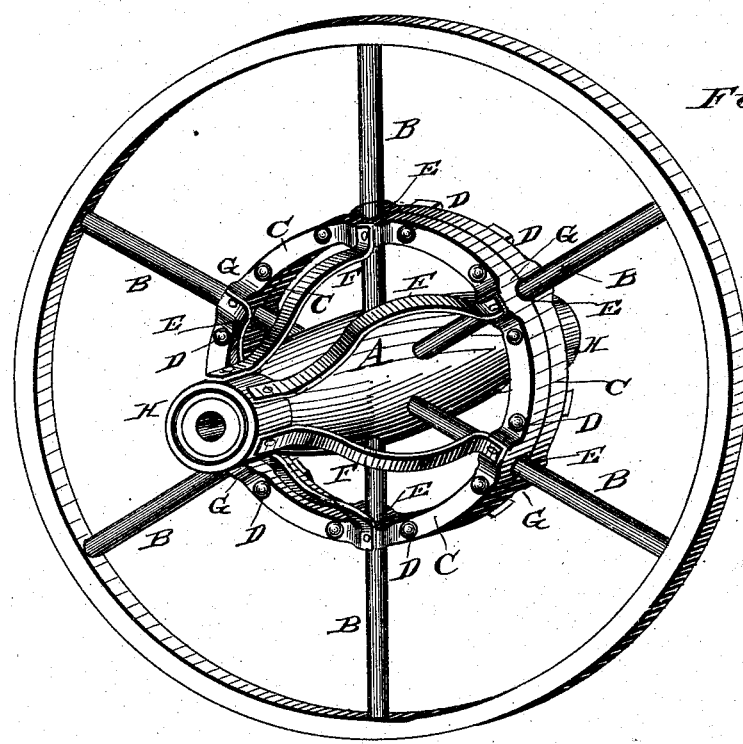
Figure 2:
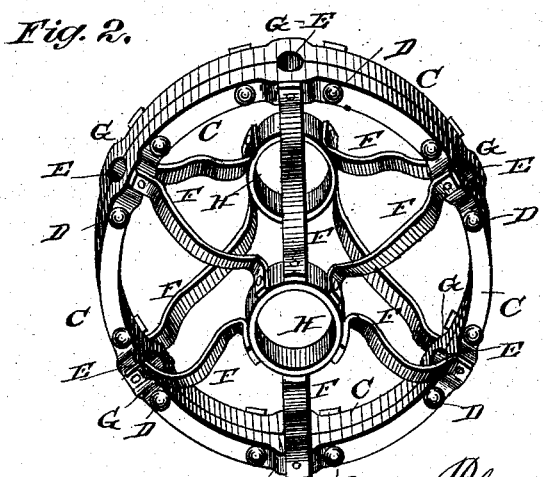

Figure 1 is a perspective view of a vehicle-wheel provided with my improved brace, and Fig. 2 is a similar view of the brace detached.

Similar letters of reference indicate corresponding parts in both the figures.

My invention has relation to braces for the spokes of vehicle-wheels; and it consists in the improved construction and combination of parts of a brace consisting of two rings secured together, and having recesses in their meeting sides, and provided with a number of brace-rods passing to one or two rings secured upon the hub of a vehicle-wheel, the spokes fitting in the recesses in the meeting sides of the rings, as hereinafter more fully described and claimed.

In the accompanying drawings, the letter A indicates the hub, and B the spokes of a vehicle-wheel of the usual construction; and C C indicate two rings, secured together by means of rivets or bolts D, or by any other desirable means, which rings have recesses E in their meeting sides, which clamp the spokes of the wheel, and the outer sides of which form bulges upon the outer sides of the rings, the latter being of the same width or thickness at all points. A number of brace-rods, F, are secured at one end upon the outer sides of these bulges G, and are secured at their other ends upon two rings, H, adapted to be fastened over the two ends of the hub, thus supporting and bracing the spoke-clamping rings. If desired, where a less amount of strength is required, one set of brace-rods and one hub-clamping ring may be used, making the device lighter and less bulky. It will be seen that these braced spoke-clamping rings will prevent the wheel from dishing, brace the entire wheel, and distribute any strain or jar upon the wheel upon all the spokes, thus preventing the spokes from becoming loosened in the hub.

The entire device will add only slightly to the weight of the wheel, and add greatly to its strength and durability.

Having thus described my invention, I claim and desire to secure by Letters Patent of the United States—

1. A device for bracing the spokes of vehicle-wheels, consisting of two recessed spoke-clamping rings having braces extending to fastenings upon the hub, as and for the purpose shown and set forth.

2. The combination of two spoke-clamping disks having recesses in their meeting sides for the reception of the spokes, rings fastened upon the ends of the hub, and brace-rods extending between the spoke-clamping and the hub-clamping rings, as and for the purpose shown and set forth.

3. The combination of a hub of a vehicle-wheel, the spokes, two spoke-clamping rings secured together, and bulged to form recesses for the reception of the spokes, hub-clamping rings fastened around the ends of the hub, and brace-rods extending from the spoke-clamping to the hub-clamping rings, as and for the purpose shown and set forth.

In testimony that I claim the foregoing as my own I have hereunto affixed my signature in presence of two witnesses.

PHILIP HARRIS STEIN.

Witnesses:
D. G. JONES,
R. L. THIELAN.